US012436521B2

(12) United States Patent
Vasudevan et al.

(10) Patent No.: US 12,436,521 B2
(45) Date of Patent: Oct. 7, 2025

(54) METHOD AND SYSTEM FOR ENHANCING INTERSECTION SAFETY

(71) Applicant: University of Alaska Anchorage, Anchorage, AK (US)

(72) Inventors: Vinod Vasudevan, Anchorage, AK (US); Mohammad Heidari Kapourchali, Anchorage, AK (US)

(73) Assignee: University of Alaska Anchorage, Anchorage, AK (US)

( * ) Notice: Subject to any disclaimer, the term of this patent is extended or adjusted under 35 U.S.C. 154(b) by 211 days.

(21) Appl. No.: 17/744,151

(22) Filed: May 13, 2022

(65) Prior Publication Data

US 2022/0365513 A1 Nov. 17, 2022

Related U.S. Application Data

(60) Provisional application No. 63/188,744, filed on May 14, 2021.

(51) Int. Cl.
G05B 19/4155 (2006.01)
G08G 1/04 (2006.01)
G08G 1/052 (2006.01)
H05B 47/115 (2020.01)

(52) U.S. Cl.
CPC ........... *G05B 19/4155* (2013.01); *G08G 1/04* (2013.01); *G08G 1/052* (2013.01); *H05B 47/115* (2020.01); *G05B 2219/23153* (2013.01)

(58) Field of Classification Search
CPC ...... G05B 19/4155; G05B 2219/23153; G08G 1/04; G08G 1/052; G08G 1/0116; G08G 1/02; G08G 1/095; H05B 47/115; H05B 47/175; H05B 47/105
See application file for complete search history.

(56) References Cited

U.S. PATENT DOCUMENTS

| | | | | |
|---|---|---|---|---|
| 11,772,642 B2 * | 10/2023 | Liles | ................... | B60W 30/095 |
| | | | | 701/119 |
| 2005/0143889 A1 * | 6/2005 | Isaji | ...................... | G08G 1/161 |
| | | | | 701/80 |
| 2013/0278146 A1 * | 10/2013 | Wilsher | ................. | H05B 47/11 |
| | | | | 315/151 |
| 2015/0339919 A1 * | 11/2015 | Barnett | ................... | F21S 8/086 |
| | | | | 340/907 |
| 2020/0064856 A1 * | 2/2020 | Silver | ................. | B60R 11/0247 |
| 2023/0334985 A1 * | 10/2023 | Meleder | ................... | H04Q 9/00 |

* cited by examiner

*Primary Examiner* — Mohammad Ali
*Assistant Examiner* — Sheela Rao
(74) *Attorney, Agent, or Firm* — Ballard Spahr LLP

(57) ABSTRACT

Disclosed are methods and systems for improving the safety of an intersection. One or more sensor readings can be received. The one or more sensor readings can be compared to one or more thresholds. A signal can be provided to one or more lighting devices based on whether the one or more sensor readings satisfy the one or more thresholds.

17 Claims, 5 Drawing Sheets

METHOD AND SYSTEM FOR ENHANCING INTERSECTION SAFETY

CROSS-REFERENCE TO RELATED APPLICATION

This application claims the priority benefit of U.S. Provisional Patent Application No. 63/188,744, filed May 14, 2021, the entirety of which is hereby incorporated herein by reference.

BACKGROUND

The safety of drivers and pedestrians at intersections is a major component of overall roadway safety. According to the Department of Transportation, in 2019, of the approximately 36,000 traffic fatalities, over 10,000 involved an intersection. Both drivers and pedestrians rely on their senses and real-time determinations as to whether or not an intersection is safe to enter. Further, crashes at isolated road intersections are dangerous, and may result in fatalities. Often, poor lighting of the intersection plays a significant role in the number and frequency of crashes at rural intersections. Intersection crashes during nighttime hours occur because of poor lighting which prevents a driver from seeing a pedestrian. Thus, there is a need for methods and systems to enhance the safety of intersections.

SUMMARY

It is to be understood that both the following general description and the following detailed description are exemplary and explanatory only and are not restrictive. Provided are methods and a smart light system for signaling road user presence. In an aspect, a method can comprise receiving, from one or more sensors configured to monitor one or more lanes of oncoming traffic, one or more sensor readings; determining whether one or more thresholds associated with the one or more sensor readings is satisfied; and providing a first signal to a first lighting device in response to the one or more thresholds being satisfied, wherein the first lighting device is configured to illuminate a road intersection and may further indicate a potential for a road user to cross a lane of oncoming traffic.

In an aspect, an apparatus can comprise one or more sensors configured to monitor one or more lanes of oncoming traffic; one or more lighting devices; a controller configured to at least: receive, from the one or more sensors, one or more sensor readings; determine whether one or more thresholds associated with the one or more sensor readings is satisfied; and provide a first signal to a first lighting device of the one or more lighting devices in response to the one or more thresholds being satisfied, wherein the first lighting device indicates an approaching vehicle.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
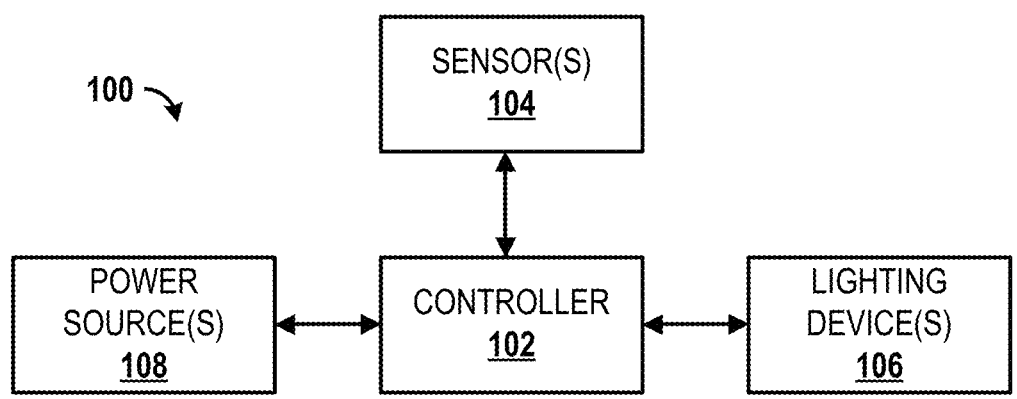
FIG. 1 shows a block diagram of an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Note that in various instances this detailed disclosure may refer to a given entity performing some action. It should be understood that this language may in some cases mean that a system (e.g., a computer) owned and/or controlled by the given entity is actually performing the action.

The present disclosure relates to methods, systems, and apparatuses for intersection safety. The method may comprise receiving, from one or more sensors, one or more sensor readings, determining the one or more sensor readings satisfy one or more thresholds, and sending, to one or more lighting devices, and based on the determination that the one or more sensor readings satisfy the one or more thresholds, a signal, wherein the signal causes the one or more lighting devices to power on or power off and thereby illuminate or darken an intersection.

A system can include one or more sensors configured to monitor one or more lanes of oncoming traffic. For example, the one or more sensors may comprise infrared sensors, microwave sensors, ultrasonic sensors, induction loops, video-based sensors, radar sensors, speed sensors, distance sensors, pressures sensors or any other sensors.

The system may comprise one or more lighting devices. The one or more lighting devices may comprise, for example, one or more streetlights comprising, for example, light emitting diodes (LEDs). The one or more lighting devices may be located proximate a roadway intersection (e.g., "an intersection.").

The system may comprise one or more communication elements. The one or more communication elements may comprise wired communication elements and/or wireless communication elements. For example, the one or more communication elements may be configured to communicate via a network. The network may comprise a satellite network, a cable network, a thread network, a zigbee communication system, Bluetooth communication system, wifi communication system, 4G, 5G, LTE, or any other communication system. The system may make use of sensors and electronic platforms to communicate with a receiver system through a wireless or wired network. Once an object is detected by the system, the system may trigger an actuation system, and interact with the end-node receiver system.

The system may comprise one or more power elements. For example, the one or more power elements may comprise one or more a solar cells, one or more batteries, one or more power grids (e.g., power plants) and may facilitate direct current, alternating current, combinations thereof, and the like.

The system may comprise a controller. The controller may be configured to receive, via the one or more communication elements, one or more sensor readings from the one or more sensors. Based on the one or more sensor readings, the controller may determine if the one or more thresholds are satisfied. For example, the controller can determine if a distance reading from a distance sensor satisfies a distance threshold. For example, a moisture sensor can determine whether a moisture threshold (surface moisture, atmospheric moisture). Other sensors are contemplated as well such as weather sensors. As another example, the controller can determine if a speed reading from a speed sensor satisfies a speed threshold. The controller can be configured to determine a time of arrival. As a further example, the controller can determine, based on a distance reading and a speed reading, a time value estimating a time until a vehicle in oncoming traffic enters an intersection or crosses some other distance threshold. The controller can then determine if the time value satisfies the time threshold. The controller may be configured to query a database or otherwise access information. For example, the controller may be configured to determine a speed limit associated with the one or more lanes. For example, the controller may determine, based on its GPS coordinates or some other data, that the speed limit associated with the one or more lanes is 60 miles per hour (mph). Using the speed limit and the distance, the controller may be configured to determine the time of arrival to the intersection. If the time of arrival satisfies the time threshold, the controller may send, to the one or more lighting devices, a signal, wherein the signal causes the one or more lighting devices to power on and thereby illuminate the intersection. The one or more thresholds may be adjusted based on one or more sensor readings, for example, the distance and/or speed thresholds may be adjusted based on a light reading from a light sensor and/or a moisture reading from a moisture sensor.

If the one or more thresholds are satisfied, the controller can provide a first signal to the one or more lighting devices. The first signal may cause the one or more lighting devices to turn on and thereby illuminate the intersection.

FIG. 1 illustrates a block diagram of an example system 100. Included in the system 100 is a controller 102, one or more sensors 104, one or more lighting devices 106, and one or more power sources 108. The controller 102 can comprise a computing device as set forth in, and further described with reference to, FIG. 4. The controller 102 can also comprise dedicated circuitry, logic, solid state devices, computer-readable media, logic gates, signal processing apparatuses, or other signal processing components as can be appreciated. The controller 102 is communicatively coupled to the one or more sensors 104. The one or more sensors 104 can be configured to provide one or more sensor readings to the controller 102. In an aspect, the one or more sensors 104 can include speed sensors, distance sensors, motion sensors, combinations thereof, or other sensors as can be appreciated. The one or more sensors 104 can include light-based sensors, sound-based sensors, or other types of sensors.

In an aspect, the one or more sensors 104 can be configured to monitor one or more lanes of traffic. For example, the one or more sensors 104 can be directed such that their range of detection encompasses a portion of the one or more lanes of traffic. In an aspect, the one or more sensors 104 can be calibrated based on a size of objects to be detected. For example, the one or more sensors 104 can be calibrated to detect objects approximating a vehicle size (e.g. motorcycle, automobile) or greater. Determining the size of the vehicle may be accomplished via object detection and/or object recognition methods known in the art.

The controller 102 can be configured to determine whether one or more thresholds are satisfied based on the one or more sensor readings. In an aspect, a threshold can be considered satisfied if a value compared against the threshold equals the threshold, falls above the threshold, or falls below the threshold, depending on the configuration of the controller 102 and the corresponding value. This can include determining whether the one or more thresholds are satisfied by the one or more sensor readings. For example, the controller 102 can determine if a distance threshold is satisfied by a sensor reading determined by a distance sensor. As another example, the controller 102 can determine if a speed threshold is satisfied by a sensor reading determined by a speed sensor. This can also include determining whether the one or more thresholds are satisfied based on one or more values calculated based on the one or more sensor readings. For example, the controller 102 can calculate, based on a sensor reading from a distance sensor and a sensor reading from a speed sensor, an estimated time for an object to cover a distance. The distance can correspond to a distance from the object (e.g., the vehicle) to a point (e.g., the intersection), and/or a distance from the object to the one or more sensors. The controller 102 can then determine if the time value satisfies a time threshold. As a further example, the controller 102 can determine if a combination of thresholds are satisfied by a combination of sensor readings. For example, the controller 102 can determine if a distance reading falls below a distance threshold and a speed reading falls above a speed threshold, indicating that a nearby vehicle is approaching the intersection, thereby differentiating vehicles that are nearby but not approaching the intersection, e.g. a parked vehicle.

Figure 5:
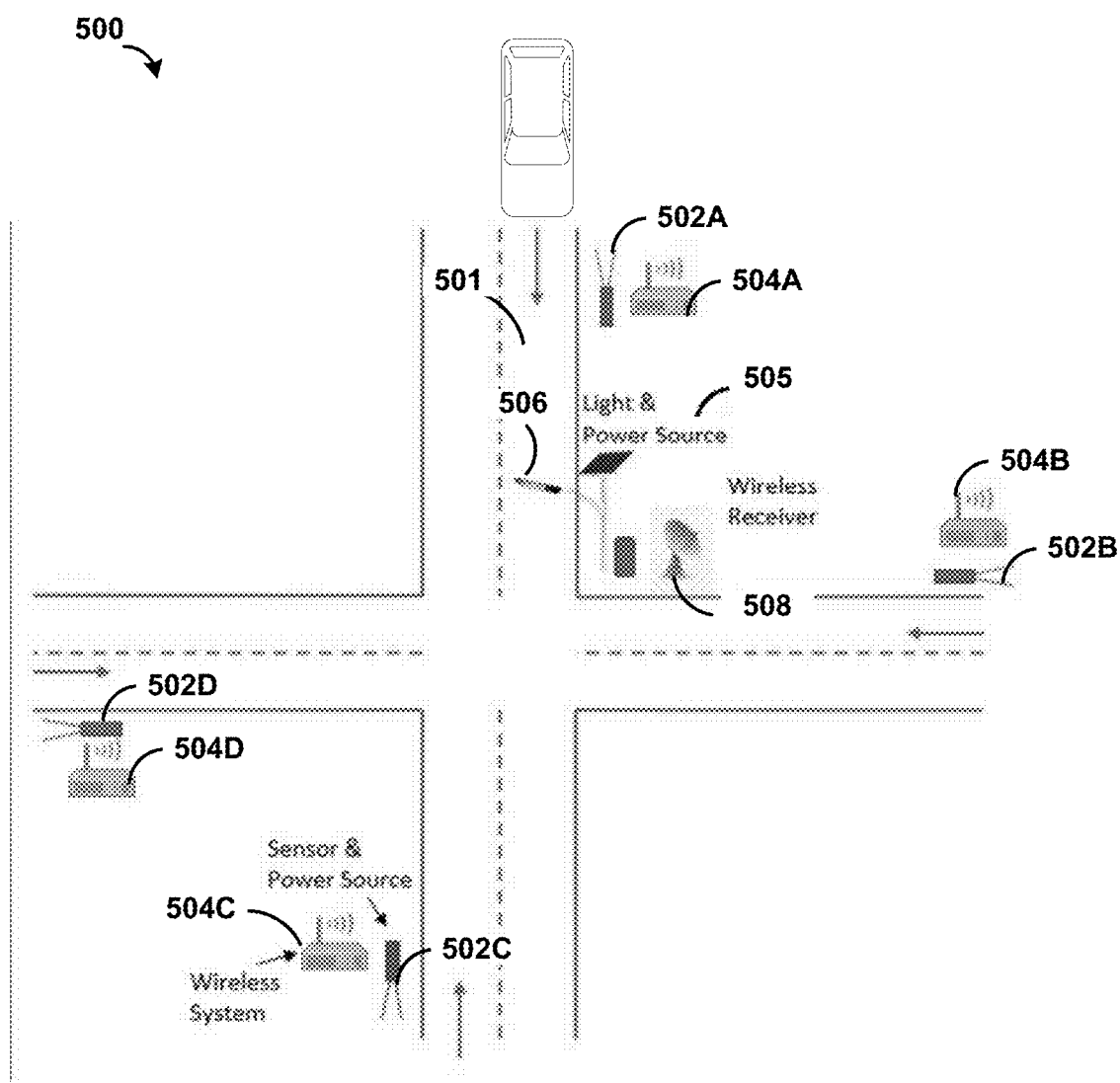
FIG. 5 shows an example system.

In an aspect, the controller 102 can provide signals to the one or more lighting devices 106 based on whether the one or more thresholds are satisfied. In an aspect, the one or more lighting devices 106 can comprise one or more streetlights (as seen in FIG. 5). In an embodiment, the one or more lighting devices 106 may further comprise text displays, colored lights, signs, or other approaches for displaying information (e.g., a countdown). Thus, providing the signal to the one or more lighting devices 106 activates the respective lighting device, e.g. turning on a light, providing text data to a text display, activating one or more lights to form a design or shape of the lighting device, etc.

Figure 2:
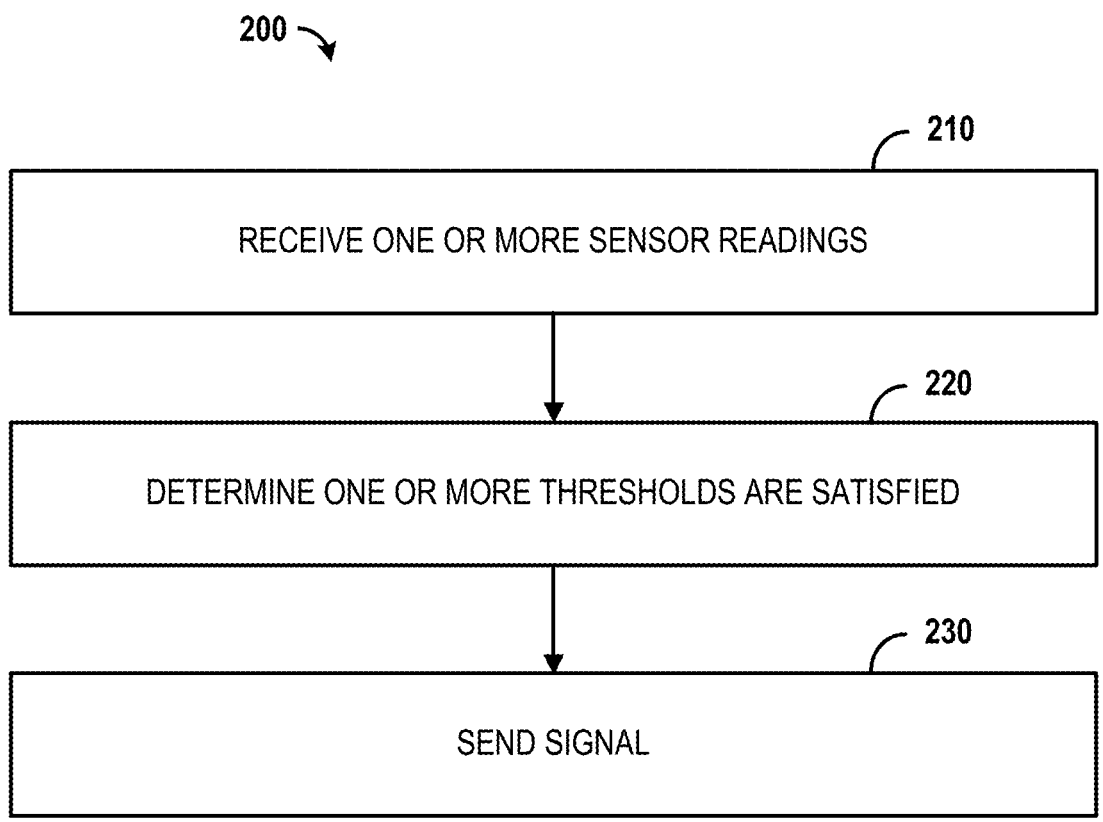
FIG. 2 shows a flowchart of an example method.

FIG. 2 is a flowchart 200 of an example method 200. In an aspect, the method 200 described in the flowchart can be performed by the controller 102 of FIG. 1. Beginning with step 210, one or more sensor readings can be received. In an aspect, the one or more sensor readings can be received from the one or more sensors 104. In an aspect, the one or more sensors 104 can include speed sensors, distance sensors, motion sensors, weather sensors, light sensors, sound sensors, pressure sensors, combinations thereof, and the like.

In an aspect, the one or more sensors 104 can include one or more sensors configured to monitor one or more lanes of oncoming traffic. For example, the one or more sensors 104 can be directed such that their range of detection encompasses a portion of the one or more lanes of oncoming traffic. In an aspect, the one or more sensors 104 can be calibrated based on a size of objects to be detected. For example, the one or more first sensors 104 can be calibrated to detect objects approximating a vehicle size (e.g. motorcycle, automobile) or greater.

At step 220, it can be determined whether one or more thresholds are satisfied based on the one or more sensor readings. In an aspect, a threshold can be considered satisfied if a value compared against the threshold equals the threshold, falls above the threshold, or falls below the threshold. One skilled in the art can appreciate that various thresholds can be defined and satisfied according to the desired results. Determining whether the one or more thresholds are satisfied can include determining whether the one or more thresholds are satisfied by the one or more sensor readings. It can be determined if a distance threshold is satisfied by a sensor reading by a distance sensor. As another example, it can be determined if a speed threshold is satisfied by a sensor reading from a speed sensor. Determining whether the one or more thresholds are satisfied can also include determining whether the one or more thresholds are satisfied based on one or more values calculated based on the one or more sensor readings. For example, an estimated time value can be calculated based on a sensor reading from a distance sensor and a sensor reading from a speed sensor. The time value can comprise an estimated time for an object (e.g. a vehicle) to cover a distance. The distance can correspond to a distance from the object to an entrance into an intersection, or a distance from the object to another point. The time value can then be compared to a time threshold to determine if the time value satisfies the time threshold. As a further example, determining whether the one or more thresholds are satisfied can include determining if a combination of thresholds are satisfied by a combination of sensor readings. For example, it can be determined if a distance reading falls below a distance threshold and a speed reading falls above a speed threshold, indicating that a nearby vehicle is approaching the intersection, thereby differentiating vehicles that are nearby but not approaching the intersection, e.g. a parked vehicle.

At step 230, a signal may be provided to a lighting device of the one or more lighting devices 106. The first signal may cause the one or more lighting devices to turn on, thereby illuminating the intersection. For example, based on preconfigured data indicating that the sensor is located 10 meters from the entrance to the intersection, and determining a distance to the vehicle from the sensor of 20 meters, the sensor may determine that the vehicle is 30 meters from the entrance to intersection. Likewise, the controller may be configured to similarly process data and make similar determines. The controller may determine a distance threshold of 31 meters from the entrance to the intersection. The controller may determine that the position of the vehicle satisfies the threshold. The controller may send, to the lighting devices, a signal. The signal may cause the lighting device to power on and thereby illuminate the intersection. However, if the one or more thresholds are not satisfied no action will be taken.

The method may further comprise adjusting the one or more thresholds. For example, the distance threshold may be increased during wet weather. Similarly, the distance threshold may be increased at night. For example, the speed threshold may be decreased during wet weather and dark conditions as well. For example, based on preconfigured data indicating that the sensor is located 10 meters from the entrance to the intersection, and determining a distance to the vehicle from the sensor of 20 meters, the sensor may determine that the vehicle is 30 meters from the entrance to intersection. Likewise, the controller may be configured to similarly process data and make similar determines. The controller may determine a distance threshold of 31 meters from the entrance to the intersection. However, based on receiving sensor data from, for example, the moisture sensor, the controller may adjust the threshold. For example, if the moisture sensor indicates a threshold level of moisture is present on the surface of the road and/or in the air, the controller may increase the distance threshold (e.g., to 40 meters). The controller may determine that the position of the vehicle satisfies the threshold (e.g., when the vehicle is at 39 meters). The controller may send, to the lighting devices, a signal. The signal may cause the lighting device to power on and thereby illuminate the intersection. Similarly, the controller may adjust a speed threshold based on road conditions, weather conditions, and/or lighting conditions.

Figure 3:
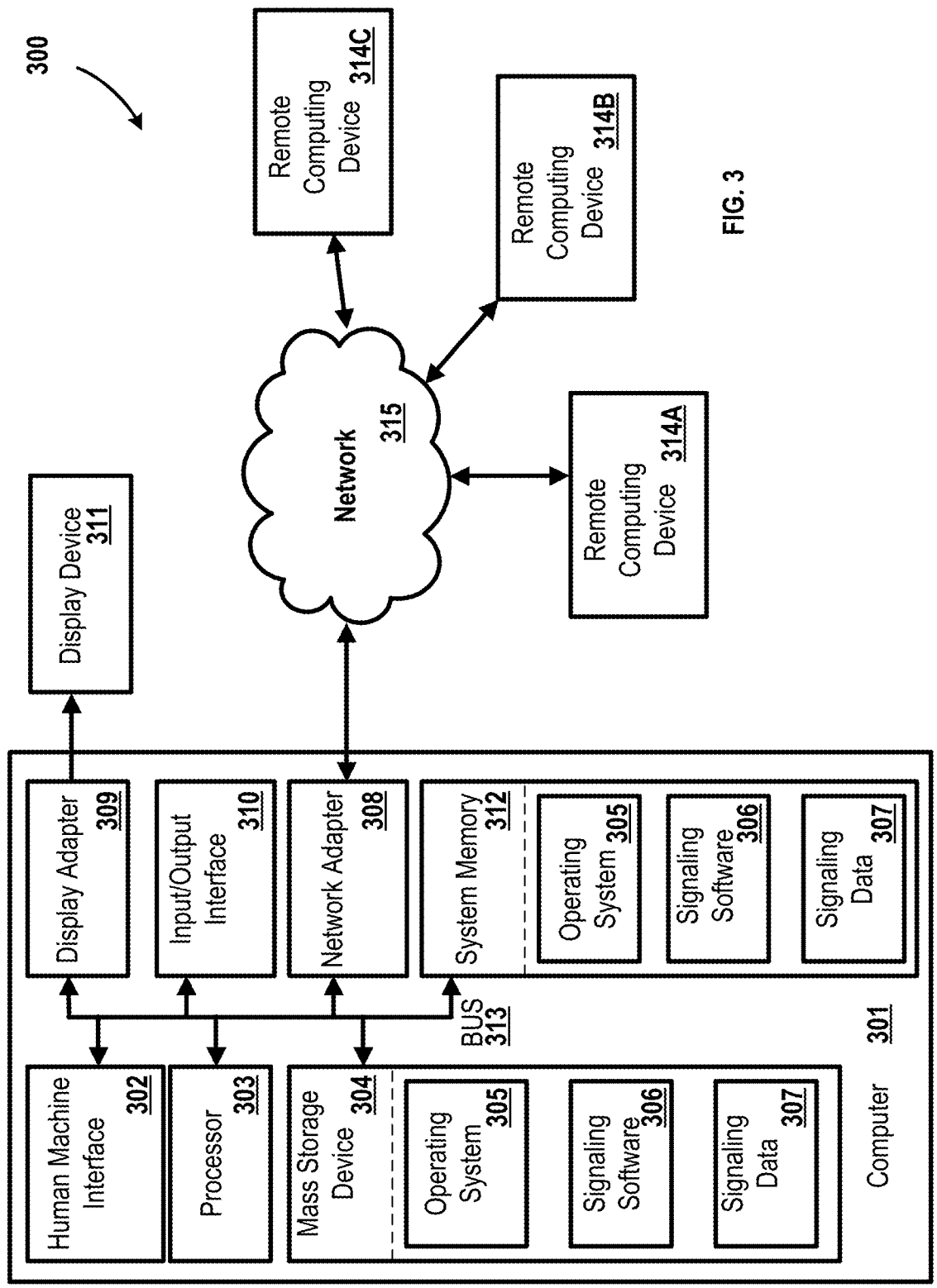
FIG. 3 shows a block diagram of an example computing device.

In an exemplary aspect, the methods and systems can be implemented on a computer 301 as illustrated in FIG. 3 and described below. By way of example, the controller 102 of FIG. 1 can be a computer as illustrated in FIG. 3. Similarly, the methods and systems disclosed can utilize one or more computers to perform one or more functions in one or more locations. FIG. 1 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

FIG. 3 show an exemplary environment 300 in which the present systems and methods may be implemented. Further, one skilled in the art will appreciate that the systems and methods disclosed herein can be implemented via a general-purpose computing device in the form of a computer 301. The components of the computer 301 can comprise, but are not limited to, one or more processors 303, a system memory 312, and a system bus 313 that couples various system components including the one or more processors 303 to the system memory 312. The system can utilize parallel computing.

The system bus 313 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 313, and all buses specified in this description can also be implemented over a wired or wireless network connection and each of the subsystems, including the one or more processors 303, a mass storage device 304, an operating system 305, signaling software 306, signaling data 307, a network adapter 308, the system memory 312, an Input/Output Interface 310, a display adapter 309, a display device 311, and a human machine interface 302, can be contained within one or more remote computing devices 314A,B,C at physically separate locations, connected through buses of this form, in effect implementing a fully distributed system.

The computer 301 typically comprises a variety of computer readable media. Exemplary readable media can be any available media that is accessible by the computer 301 and comprises, for example and not meant to be limiting, both volatile and non-volatile media, removable and non-removable media. The system memory 312 comprises computer readable media in the form of volatile memory, such as random access memory (RAM), and/or non-volatile memory, such as read only memory (ROM). The system memory 312 typically contains data such as the signaling data 307 and/or program modules such as the operating system 305 and the signaling software 306 that are immediately accessible to and/or are presently operated on by the one or more processors 303.

In another aspect, the computer 301 can also comprise other removable/non-removable, volatile/non-volatile computer storage media. By way of example, FIG. 3 illustrates the mass storage device 304 which can provide non-volatile storage of computer code, computer readable instructions, data structures, program modules, and other data for the computer 301. For example and not meant to be limiting, the mass storage device 304 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 304, including by way of example, the operating system 405 and the signaling software 306. Each of the operating system 305 and the signaling software 306 (or some combination thereof) can comprise elements of the programming and the signaling software 306. The signaling data 307 can also be stored on the mass storage device 304. The signaling data 307 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 301 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 303 via the human machine interface 302 that is coupled to the system bus 313, but can be connected by other interface and bus structures, such as a parallel port, game port, an IEEE 1393 Port (also known as a Firewire port), a serial port, or a universal serial bus (USB).

In yet another aspect, the display device 311 can also be connected to the system bus 313 via an interface, such as the display adapter 309. It is contemplated that the computer 301 can have more than one display adapter 309 and the computer 301 can have more than one display device 311. For example, the display device 311 can be a monitor, an LCD (Liquid Crystal Display), or a projector. In addition to the display device 311, other output peripheral devices can comprise components such as speakers (not shown) and a printer (not shown) which can be connected to the computer 301 via the Input/Output Interface 310. Any step and/or result of the methods can be output in any form to an output device. Such output can be any form of visual representation, including, but not limited to, textual, graphical, animation, audio, tactile, and the like. The display device 311 and computer 301 can be part of one device, or separate devices.

The computer 301 can operate in a networked environment using logical connections to one or more remote computing devices 314A,B,C. By way of example, a remote computing device can be a personal computer, portable computer, smartphone, a server, a router, a network computer, a peer device or other common network node, and so on. Logical connections between the computer 301 and a remote computing device 314A,B,C can be made via a network 315, such as a local area network (LAN) and/or a general wide area network (WAN). Such network connections can be through the network adapter 308. The network adapter 308 can be implemented in both wired and wireless environments. Such networking environments are conventional and commonplace in dwellings, offices, enterprise-wide computer networks, intranets, and the Internet.

For purposes of illustration, application programs and other executable program components such as the operating system 305 are illustrated herein as discrete blocks, although it is recognized that such programs and components reside at various times in different storage components of the computing device 301, and are executed by the one or more processors 303 of the computer. An implementation of the signaling software 306 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 4A:
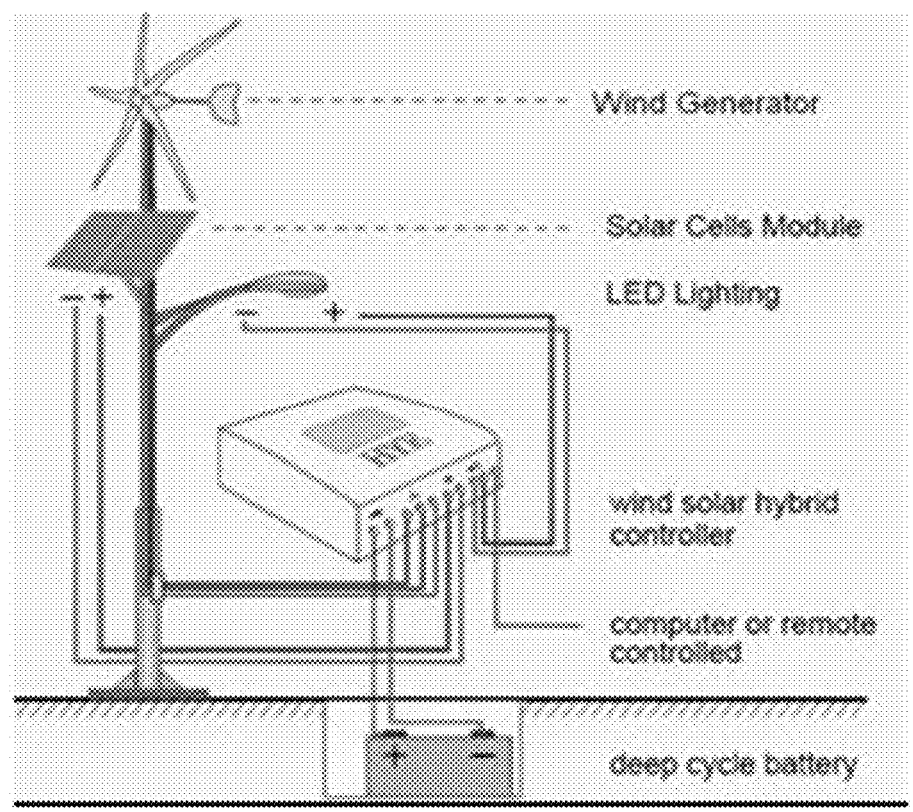
FIG. 4A shows an example apparatus.

FIG. 4A shows an example lighting device 400. The lighting device 400 may comprise a streetlight. The lighting device may comprise one or more power sources. For example, the one or more power sources may comprise a solar cells module, a wind power generator, a deep cycle battery, or connection to a power grid. The lighting device 400 may comprise a controller to control the lighting device. The controller may be configured to receive, from the one or more sensors, the one or more sensor readings. The controller may be configured to determine, based on the one or more sensors readings, whether the one or more thresholds are satisfied. The controller may be configured to send, based on the one or more thresholds being satisfied, a signal to the streetlight. The signal may be configured to cause the streetlight to power on and thereby illuminate the intersection.

Figure 4B:
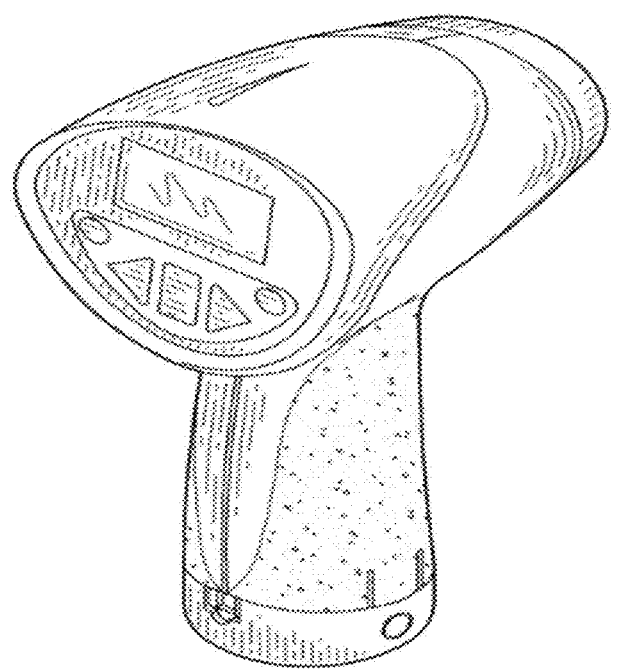
FIG. 4B shows an example sensor.

FIG. 4B shows a sensor 402. The sensor 402 may comprise a speed sensor, distance sensor, and/or any other suitable ranging sensor. For example, the sensor 402 may comprise a radio detection and ranging (RADAR) senor, a light detection and ranging (LIDAR) sensor, or any other suitable sensing technology configured to determine a position and speed of an object. The sensor 402 may be configured to determine the size and/or shape of the object via known object detection and/or object recognition techniques.

FIG. 5 shows an example system. For example, the present methods, systems, and apparatuses may be configured to operate in proximity to one or more intersections. The one or more intersections may comprise, for example, one or more intersecting lanes of traffic. For example, the system may comprise one or more sensors 502A,B,C,D. Each of the one or sensors may be communicatively coupled to one or more power sources. Each of the one or more sensors may be communicatively coupled to one or more wireless (or wired) communication systems (e.g., communication devices) 504A,B,C,D. For example, the system may comprise a light and power source 505. For example, the system may comprise a wireless receiver 508 such as a satellite dish. In operation, a sensor (e.g., sensor 502A) may detect the presence of a vehicle in lane 501. The sensor 502A may determine a position of the vehicle. For example, based on preconfigured data indicating that the sensor 502A is located 10 meters from the entrance to the intersection, and determining a distance to the vehicle from the sensor of 20 meters, the sensor may determine that the vehicle is 30 meters from the entrance to intersection. Likewise, the controller 504A may be configured to similarly process data and make similar determines. The controller 504A may determine a distance threshold of 31 meters from the entrance to the intersection. The controller 504A may determine that the position of the vehicle satisfies the threshold. The controller 504A may send, to the lighting devices 506, a signal. The signal may cause the lighting device 506 to power on and thereby illuminate the intersection.

The aforementioned examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   receiving, from one or more sensors configured to monitor one or more lanes of traffic, one or more sensor readings;
   determining, based on the one or more sensor readings, whether a first threshold indicating a vehicle has entered a proximity to the intersection is satisfied;
   sending, based on the first threshold being satisfied, a first signal to one or more lighting devices located proximate an intersection, wherein the first signal causes the one or more lighting devices illuminate the intersection;
   determining, based on the one or more sensor readings, whether a second threshold indicating the vehicle has left the proximity to the intersection is satisfied; and
   sending, based on the second threshold being satisfied, a second signal to the one or more lighting devices located proximate the intersection, wherein the second signal causes the one or more lighting devices to power down.

2. The method of claim 1, wherein the one or more sensors comprise at least one of: a distance sensor, a speed sensor, or a size sensor.

3. The method of claim 1, wherein the one or more sensors comprise at least one of: a radio detection and ranging (RADAR) sensor, a light detection and ranging (LIDAR) sensor, or a pressure sensor.

4. The method of claim 1, wherein the one or more lighting devices located proximate the intersection comprise one or more streetlights.

5. The method of claim 1, wherein the one or more sensor readings indicate at least one of: a presence of a vehicle, a distance from the vehicle to the intersection, a speed of the vehicle, or a size of the vehicle.

6. The method of claim 1, wherein the one or more thresholds wherein the method further comprises:
   determining a distance of an oncoming vehicle; and
   determining the distance of the oncoming vehicle satisfies the first threshold.

7. The method of claim 1, wherein the method further comprises:
   determining a speed of an oncoming vehicle;
   determining, based on the speed of the oncoming vehicle and a distance of the oncoming vehicle, a time value; and
   determining the time value satisfies the first threshold.

8. A system, comprising:
   a computing device configured to:
     receive, from one or more sensors configured to monitor one or more lanes of traffic, one or more sensor readings;
     determine, based on the one or more sensor readings, whether a first threshold indicating a vehicle has entered a proximity to the intersection is satisfied;
     send, based on the first threshold being satisfied, a first signal to one or more lighting devices located proximate an intersection, wherein the first signal causes the one or more lighting devices illuminate the intersection;
     determine, based on the one or more sensor readings, whether a second threshold indicating the vehicle has left the proximity to the intersection is satisfied; and
     send, based on the second threshold being satisfied, a second signal to the one or more lighting devices located proximate the intersection, wherein the second signal causes the one or more lighting devices to power down; and
   the one or more lighting devices configured to:
     receive, from the computing device, the first signal and the second signal.

9. The system of claim 8, wherein the one or more sensors comprise at least one of: a distance sensor, a speed sensor, or a size sensor.

10. The system of claim 8, wherein the one or more sensor readings indicate at least one of: a presence of a vehicle, a distance from the vehicle to the intersection, a speed of the vehicle, or a size of the vehicle.

11. The system of claim 8, wherein the one or more lighting devices located proximate the intersection comprise one or more streetlights.

12. The system of claim 8, wherein the computing device is further configured to:
   determine a distance of an oncoming vehicle; and
   determine the distance of the oncoming vehicle satisfies the first threshold.

13. The system of claim 8, wherein the computing device is further configured to:
   determine a speed of an oncoming vehicle;
   determine, based on the speed of the oncoming vehicle and a distance of the oncoming vehicle, a time value; and
   determine the time value satisfies the first threshold.

14. An apparatus comprising:
   one or more processors; and
   memory storing processor executable instructions that, when executed by the one or more processors, cause the apparatus to:
      receive, from one or more sensors configured to monitor one or more lanes of traffic, one or more sensor readings;
      determine, based on the one or more sensor readings, whether a first distance threshold indicating a vehicle has entered a proximity to the intersection is satisfied;
      send, based on the first distance threshold being satisfied, a first signal to one or more lighting devices located proximate an intersection, wherein the first signal causes the one or more lighting devices illuminate the intersection;
      determine, based on the one or more sensor readings, whether a second distance threshold indicating the vehicle has left the proximity to the intersection is satisfied; and
      send, based on the second distance threshold being satisfied, a second signal to the one or more lighting devices located proximate the intersection, wherein the second signal causes the one or more lighting devices to power down.

15. The apparatus of claim 14, wherein the one or more sensor readings indicate at least one of: a presence of a vehicle, a distance from the vehicle to the intersection, a speed of the vehicle, or a size of the vehicle.

16. The apparatus of claim 14, wherein the processor executable instructions, when executed by the one or more processors, further cause the apparatus to:
   determine a distance of an oncoming vehicle; and
   determine the distance of the oncoming vehicle satisfies the first threshold.

17. The apparatus of claim 14, wherein the processor executable instructions, when executed by the one or more processors, further cause the apparatus to:
   determine a speed of an oncoming vehicle;
   determine, based on the speed of the oncoming vehicle and a distance of the oncoming vehicle, a time value; and
   determine the time value satisfies the first threshold.

* * * * *